US008461537B2

(12) United States Patent
Schulz

(10) Patent No.: US 8,461,537 B2
(45) Date of Patent: Jun. 11, 2013

(54) SOLID STATE RADIATION DETECTOR ELEMENTS INCLUDING MAGNETIC HARD SILICON PHOTOMULTIPLIERS

(75) Inventor: Volkmar Schulz, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 378 days.

(21) Appl. No.: 12/812,038

(22) PCT Filed: Jan. 7, 2009

(86) PCT No.: PCT/IB2009/050038
§ 371 (c)(1),
(2), (4) Date: Jul. 8, 2010

(87) PCT Pub. No.: WO2009/090570
PCT Pub. Date: Jul. 23, 2009

(65) Prior Publication Data
US 2010/0282973 A1    Nov. 11, 2010

Related U.S. Application Data

(60) Provisional application No. 61/021,054, filed on Jan. 15, 2008.

(51) Int. Cl.
*G01T 1/166* (2006.01)
*G01T 1/29* (2006.01)
(52) U.S. Cl.
CPC .................... *G01T 1/2985* (2013.01)
USPC ................................... 250/363.04
(58) Field of Classification Search
USPC .................................... 250/363.04
See application file for complete search history.

(56) References Cited

U.S. PATENT DOCUMENTS 7,010,084 B1 * 3/2006 Moritake et al. ............... 378/19
7,207,104 B1    4/2007 Steinfeld et al.
(Continued)

FOREIGN PATENT DOCUMENTS

DE    102008033960 A1    1/2009
WO    2005048319 A2    5/2005
(Continued)

OTHER PUBLICATIONS

Dinu, N., et al.; Development of the first prototypes of Silicon PhotoMultiplier (SiPM) at ITC-irst; 2007; Nuclear Instruments and Methods in Physics Research A; 572:422-426.
Renker, D.; New trends on photodetectors; 2007; Nuclear Instruments and Methods in Physics Research A; 571:1-6.

*Primary Examiner* — David Porta
*Assistant Examiner* — Edwin Gunberg

(57) ABSTRACT

A radiation detector comprises: a substrate (54); a two-dimensional array of solid state detector elements (50) disposed on or in the substrate and defining a detector array area (52); electrodes ($E_c$, $E_a$) disposed on or in the substrate; and electrically conductive connecting lines (60, 64) disposed on or in the substrate and operatively electrically connecting the solid state detector elements and the electrodes, the electrically conductive connecting lines arranged to define a maximum area in conjunction with any one conducting solid state detector element that is less than or about one tenth of the detector array area. An imaging system comprises an MR scanner (10) and a PET or SPECT imaging system arranged to have some interaction with a magnetic field generated by the MR scanner, the PET or SPECT imaging system including scintillator elements (40) and the aforesaid radiation detectors arranged to detect scintillations generated in the scintillator elements.

23 Claims, 4 Drawing Sheets

U.S. PATENT DOCUMENTS

Figure 1:
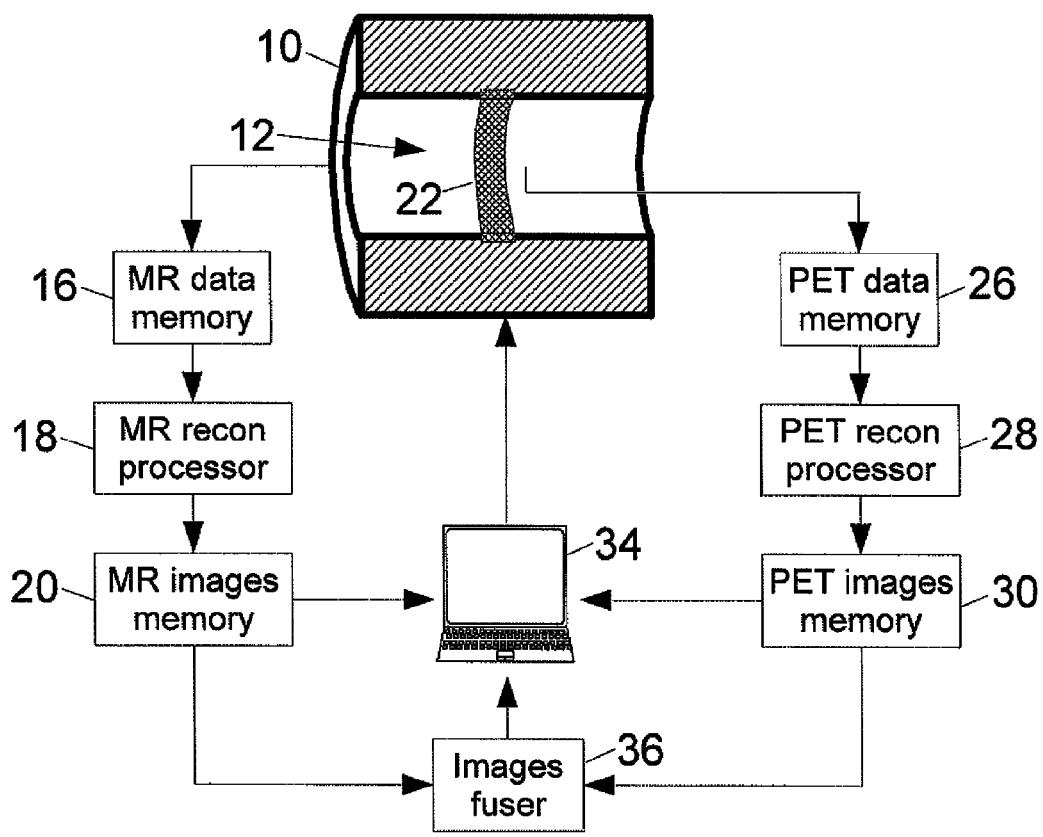

| | | |
|---|---|---|
| 7,547,872 B2 * | 6/2009 | Niclass et al. ............ 250/214 R |
| 7,723,694 B2 * | 5/2010 | Frach et al. .............. 250/370.11 |
| 2006/0175529 A1 * | 8/2006 | Harmon et al. ............... 250/207 |
| 2009/0121142 A1 | 5/2009 | Heismann et al. |

FOREIGN PATENT DOCUMENTS

| | | |
|---|---|---|
| WO | 2006111869 A2 | 10/2006 |
| WO | 2006111883 A2 | 10/2006 |
| WO | 2006114722 A1 | 11/2006 |

* cited by examiner

SOLID STATE RADIATION DETECTOR ELEMENTS INCLUDING MAGNETIC HARD SILICON PHOTOMULTIPLIERS

CROSS REFERENCE TO RELATED APPLICATIONS

This application claims the benefit of U.S. provisional application Ser. No. 61/021,054 filed Jan. 15, 2008, which is incorporated herein by reference.

The following relates to the radiation detector arts, medical imaging arts, and the like. It finds particular application in hybrid medical imaging systems providing positron emission tomography (PET) and magnetic resonance (MR) imaging capabilities, and is described with particular reference thereto. More generally, the following will find application in solid state radiation detectors used in high magnetic field environments, such as in hybrid systems including MR and single photon emission computed tomography capability (i.e., hybrid MR/SPECT systems) and in systems other than medical imaging systems that employ radiation detectors in high electromagnetic field environments.

There is interest in hybrid imaging systems for medical diagnosis, clinical monitoring, and other applications, that combine a magnetic resonance (MR) scanner with a radiation-sensitive imager such as a positron emission tomography (PET) imager or a single photon emission computed tomography (SPECT) imager. Existing PET and SPECT imagers typically employ a radiation detector including a scintillator element that produces a burst or scintillation of light when impacted by a high energy radiation particle (e.g., a 511 keV photon in the case of PET imaging) and an array of photomultiplier tube (PMT) elements arranged to detect the scintillations. However, it has been found that PMT elements are sensitive to magnetic fields generated by the MR scanner, which can alter the paths of photoejected electrons traveling in the tube.

The use of silicon photomultiplier elements in place of the PMT element has also been proposed. See, e.g., Fiedler et al., WO 2006/111869 A2; Frach et al., WO 2006/111883 A2. In the approach of Frach et al., for example, digital silicon photomultiplier elements enable integration of substantial electronics with the light radiation detectors, in some embodiments providing a direct digital output offloaded from the PET detector ring.

A less complex approach is to use radiation detectors in the form of analog silicon photomultiplier element arrays in place of the analog PMT elements. In an analog silicon photomultiplier element array, a two-dimensional array of avalanche photodiode (APD) elements are connected in parallel between anode and cathode electrodes. Impingement of a radiation particle such as a light photon in the vicinity of one of the APD elements of the array causes avalanche breakdown such that the APD becomes electrically conductive so as to support current flow between the anode and cathode electrodes. Optionally, each detector element can include a quenching resistor connected in series with the APD to enhance performance. In a typical layout, the substrate serves as one electrode, and is optionally coated with a planar indium tin oxide (ITO) layer or the like to enhance planar electrical conductivity. Electrical wiring spaced apart from the conductive substrate by an insulating layer (or spaced apart by an insulating substrate from a conductive ITO layer) contacts the APD elements and serves as the second electrode of an anode/cathode electrode combination. In this layout, the electrodes define parallel conductive plates.

It is generally regarded in the art that silicon photomultipliers, whether analog or digital, are substantially less sensitive to static magnetic fields as compared with PMT elements. Accordingly, it has been proposed (see WO 2006/111869) to use analog or digital silicon photomultipliers in hybrid scanners including MR.

The following provides new and improved apparatuses and methods which overcome the above-referenced problems and others.

A radiation detector comprises: a substrate; a two-dimensional array of solid state detector elements disposed on or in the substrate and defining a detector array area; anode and cathode electrodes disposed on or in the substrate; and electrically conductive connecting lines disposed on or in the substrate and operatively electrically connecting the solid state detector elements in parallel between the anode and cathode electrodes.

An imaging system imaging system comprises a magnetic resonance (MR) scanner and a positron emission tomography (PET) or single photon emission computed tomography (SPECT) imaging system arranged to have some interaction with a magnetic field generated by the MR scanner. The PET or SPECT imaging system includes scintillator elements and radiation detectors as set forth in the immediately preceding paragraph arranged to detect scintillations generated in the scintillator elements.

A radiation detector comprises: a substrate; a two-dimensional array of solid state detector elements disposed on or in the substrate and defining a detector array area; electrodes disposed on or in the substrate; and electrically conductive connecting lines disposed on or in the substrate and operatively electrically connecting the solid state detector elements and the electrodes, the electrically conductive connecting lines arranged to define a maximum area in conjunction with any one conducting solid state detector element that is less than or about one-tenth of the detector array area.

An imaging system comprises a magnetic resonance (MR) scanner and a positron emission tomography (PET) or single photon emission computed tomography (SPECT) imaging system arranged to have some interaction with a magnetic field generated by the MR scanner. The PET or SPECT imaging system includes scintillator elements and radiation detectors as set forth in the immediately preceding paragraph arranged to detect scintillations generated in the scintillator elements.

A radiation detector comprises: a substrate; a two-dimensional array of solid state detector elements disposed on or in the substrate and defining a detector array area; and electrically conductive connecting lines disposed on or in the substrate and operatively electrically connecting the solid state detector elements in parallel, the electrically conductive connecting lines arranged to define a maximum area in conjunction with any one conducting solid state detector element that does not encompass a two-dimensional sub-array of the two-dimensional array of solid state detector elements.

One advantage resides in reduced interference between magnetic resonance and radiological imaging components of a hybrid imaging system.

Another advantage resides in more robust radiation detectors for use in high magnetic field hybrid imaging systems.

Another advantage resides in providing radiation detector arrays with improved hardness against magnetic interference.

Still further advantages of the present invention will be appreciated to those of ordinary skill in the art upon reading and understand the following detailed description.

The drawings are only for purposes of illustrating the preferred embodiments, and are not to be construed as limiting the invention.

FIG. 1 diagrammatically shows a hybrid MR/PET system.

Figure 2:
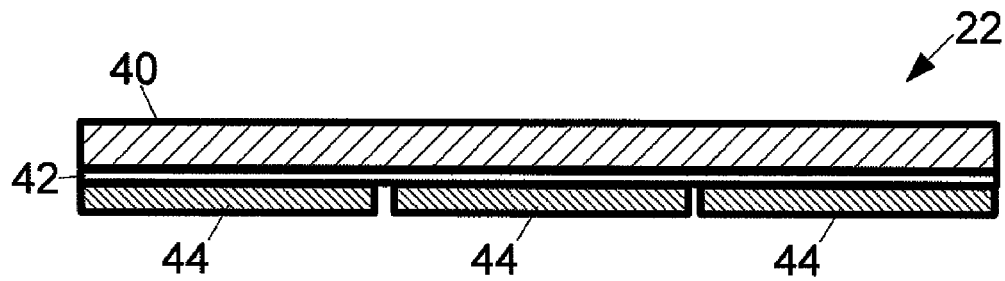

FIG. 2 diagrammatically shows a cross-sectional view of one of the radiation detector modules of the PET sub-system of the hybrid MR/PET system of FIG. 1.

Figure 3:
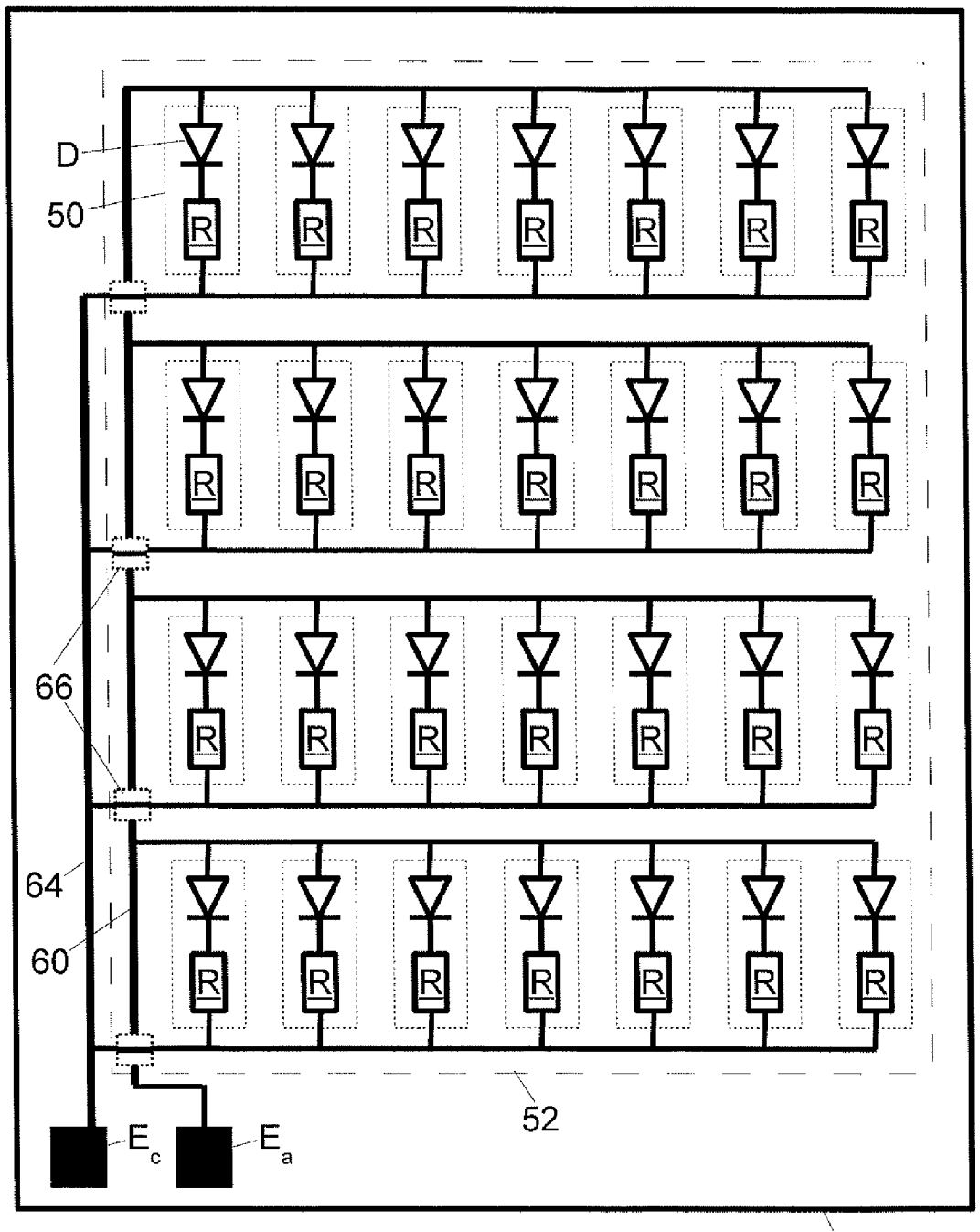

FIG. 3 diagrammatically shows a plan view of one embodiment of the solid state photomultiplier arrays of the radiation detector modules of the PET sub-system of the hybrid MR/PET system of FIG. 1.

Figure 4:
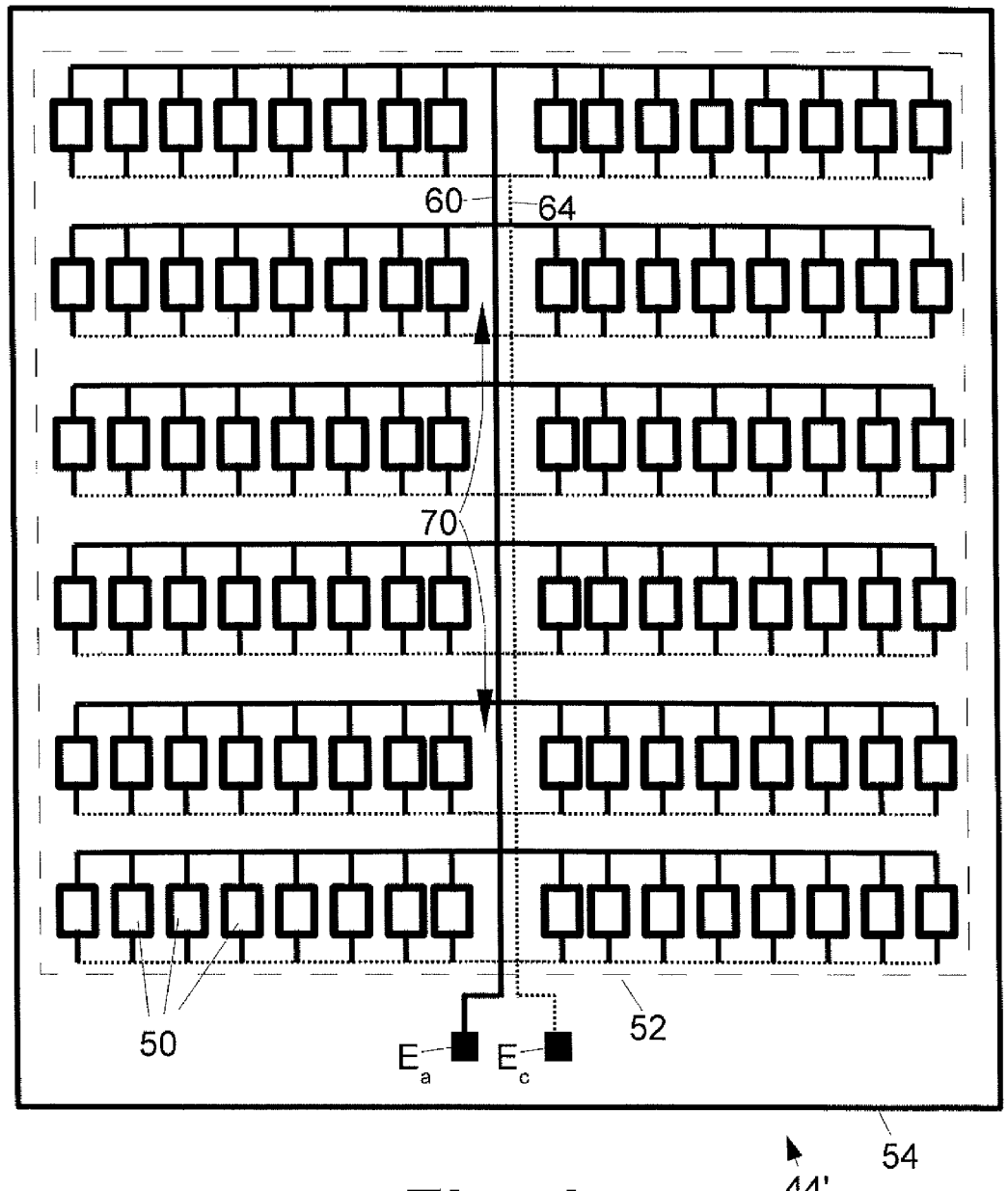

FIG. 4 diagrammatically shows a plan view of another embodiment of the solid state photomultiplier arrays of the radiation detector modules of the PET sub-system of the hybrid MR/PET system of FIG. 1.

Figure 5:
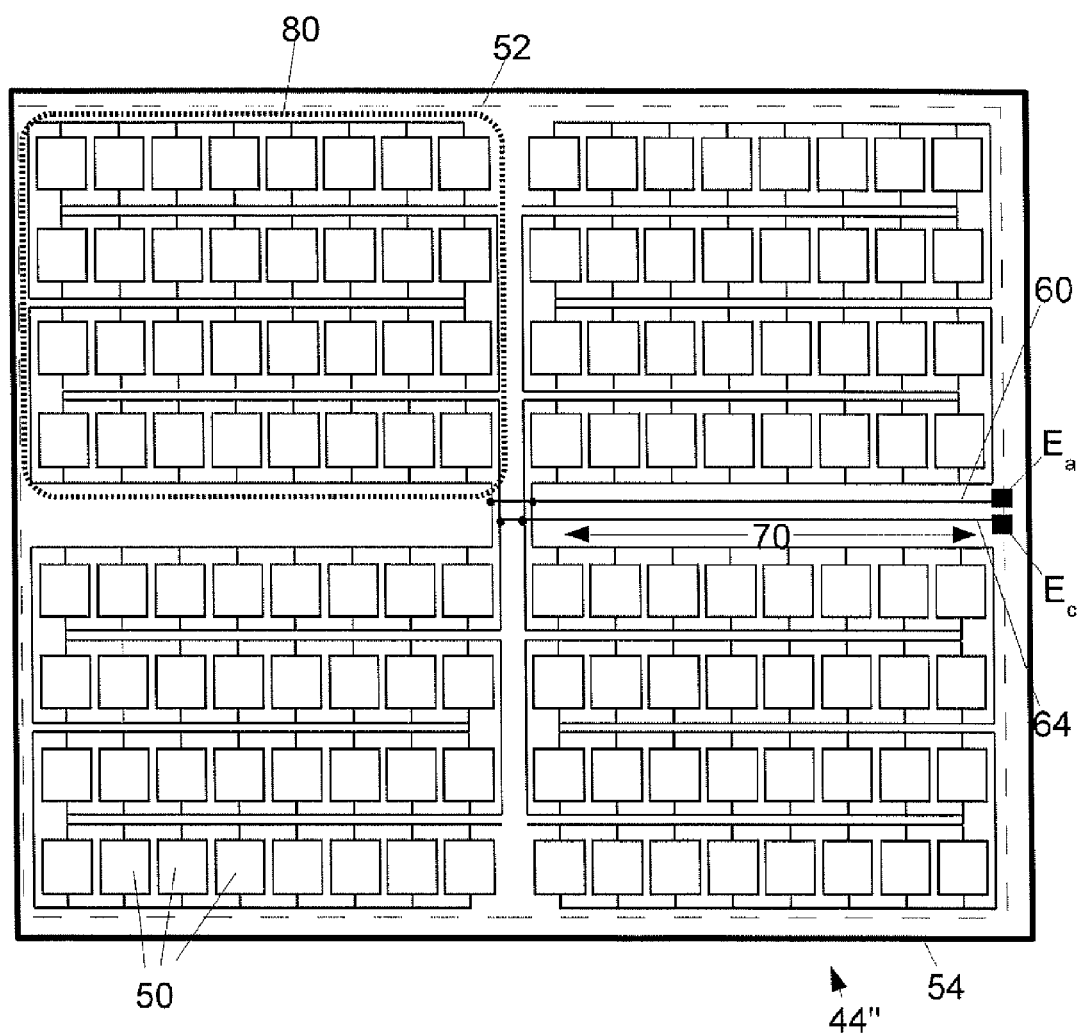

FIG. 5 diagrammatically shows a plan view of another embodiment of the solid state photomultiplier arrays of the radiation detector modules of the PET sub-system of the hybrid MR/PET system of FIG. 1.

With reference to FIG. 1, a hybrid magnetic resonance (MR)/positron emission tomography (PET) imaging system, i.e. a hybrid MR/PET imaging system, is described. The illustrative system includes a horizontal bore magnetic resonance scanner 10 which in FIG. 1 is shown in partial cross-section to reveal a portion of a cylindrical bore 12 defined by the horizontal bore magnetic resonance scanner 10. The magnetic resonance scanner 10 contains components (not individually illustrated) such as a main magnet, optional magnet shims, a magnetic field gradient system typically including a plurality of magnetic field gradient coils and optional gradient shimming or gradient corrective coils, an optional whole-body radio frequency coil, and so forth. In some embodiments, some such components may be disposed on the housing or inside the bore 12. For example, one or more radio frequency coils (not shown) may be disposed in the bore 12. Such coils may include local coils, local coil arrays, a whole-body coil arranged coaxially inside the cylindrical bore 12, or so forth.

During magnetic resonance imaging, a subject disposed inside the bore 12 is subjected to a main magnetic field and radio frequency pulses applied by a radio frequency coil at a magnetic resonance frequency to excite magnetic resonance in the subject. Optionally, selected magnetic field gradients are applied to spatially encode or limit the excited magnetic resonance, spoil the magnetic resonance, or otherwise manipulate the magnetic resonance. One or more magnetic resonance coils receive the excited and spatially encoded or otherwise manipulated magnetic resonance, and the acquired magnetic resonance signals are stored, optionally after selected processing such as digitization, normalization, or so forth, in a magnetic resonance data memory 16. For imaging applications, a magnetic resonance reconstruction processor 18 processes the magnetic resonance data, taking into account the configuration of spatial encoding used during acquisition, in order to reconstruct the magnetic resonance data into one or more magnetic resonance images that are stored in a magnetic resonance images memory 20. For example, if the spatial encoding employs Cartesian encoding, a Fourier transform-based reconstruction algorithm may be suitably applied by the reconstruction processor 18.

The illustrated MR scanner 10 is a horizontal bore type scanner. However, other types of MR scanners can also be used, such as a vertical bore scanner, open-bore scanner, or so forth.

The illustrated hybrid imaging system also includes a PET imager. A ring of PET detectors 22 is arranged inside the bore 12 of the MR scanner 10. The PET detectors 22 are configured to detect 511 keV gamma particles emitted by positron-electron annihilation events. In other embodiments, a radiation-based imaging system other than PET may be included in place of or in addition to PET, such as SPECT, which entails detection of gamma particles of energies that are generally other than 511 keV. The illustrated ring of PET detectors 22 is an annular ring positioned at the center of the bore 12, which advantageously enables the PET imaging to view the same region as the MR imaging; however, an offset or otherwise non-aligned positioning of the PET detectors respective to the MR bore is also contemplated. Moreover, for some imaging modalities such as SPECT, the detectors may be other than a complete annular ring. For example, SPECT can employ a plurality of discrete detector regions or "heads" spaced apart around the bore. Still further, while the illustrated ring of PET detectors 22 is mounted on a surface of the MR scanner 10 facing the bore 12, it is also contemplated to locate the PET detectors inside of the MR scanner, for example behind a bore liner, behind a radio frequency coil, interleaved between rungs of a birdcage radio frequency coil, or so forth. If the radiation detectors are mounted inside of the MR scanner, the bore liner, radio frequency coil, or other MR components disposed between the radiation detectors and the bore (and hence "in the view" of the radiation detectors) should be transmissive or transparent for the 511 keV gamma particles or other radiation of interest.

The acquired radiation data are stored in a data memory, such as a PET data memory 26 in the embodiment of FIG. 1. In the case of a PET imager, it is known that each electron-hole annihilation event produces two oppositely directed 511 keV gamma particles; accordingly, 511 keV gamma particle detection events are suitably analyzed for coincidence, i.e. two 511 keV gamma particle detection events lying within a short "coincidence" window are deemed to be substantially simultaneous detection events that are assumed to be the result of a single electron-positron annihilation event that occurred somewhere along a "line of response" connecting the two gamma particle detection events. In some embodiments, the PET imager incorporates time-of-flight information contained in the small time differential between the two substantially simultaneous 511 keV gamma particle detection events to further localize the electron-hole annihilation event along the line of response. This is known as time-of-flight PET, and is described in additional detail in WO 2006/111869 A2 which is incorporated herein by reference in its entirety. For radiation-based imaging techniques other than PET, there is generally no inherent pairing of radiation detection events, and so in a technique such as SPECT the radiation detection events are treated individually. Typically in SPECT the radiation detectors include suitable radiation collimators to confine the detected radiation events along lines, narrow-angle cones, or planes of response defined by the collimator geometry.

With continuing reference to the illustrative example of FIG. 1, the acquired PET data are reconstructed by a PET reconstruction processor 28 to generate one or more PET images that are stored in a PET images memory 30. Some suitable reconstruction techniques include filtered backprojection, iterative backprojection, and so forth. Reconstruction of SPECT data typically employs similar techniques.

In a PET imaging session, a suitable radiopharmaceutical is administered to the subject prior to PET imaging. The radiopharmaceutical is designed to aggregate preferentially in portion of the subject that is of interest, such as the blood stream, an organ of interest, or so forth. The radiopharmaceutical contains a radioactive substance that generates positrons during radioactive decay, so that the subsequently annihilated positrons generate the oppositely directed 511 keV gamma particles that are detected by the PET detectors 22. SPECT imaging is similar, except that the radiopharmaceutical is configured to generate another type of detectable radiation.

An advantage of the hybrid imaging system is that the MR and PET (or other radiological) images can be acquired simultaneously or in close temporal succession, without moving the subject in between the MR and PET (or other radiological) imaging. This facilitates spatial and temporal alignment of the MR and PET images, and reduces a likelihood of inadvertent movement of the subject in between the MR and PET imaging. The resulting images can be displayed on a user interface 34, for example with the MR and PET images shown side-by-side for convenient visual comparison. Optionally, an images fuser 36 combines the MR and PET images into a displayed representation that overlays or otherwise combines the MR and PET images for display on the user interface 34. For example, in some diagnostic approaches, the MR images provide anatomical information while the PET images provide metabolic or functional information. The fused MR/PET images enable the metabolic or functional information of the PET images to be placed into context using the anatomical information of the MR images.

With reference to FIG. 2, a module or other portion or unit of the PET detectors 22 is shown. The illustrated PET detector 22 includes a scintillator 40, an optional light pipe or lightguide 42, and solid state radiation detectors 44. A 511 keV gamma particle or other radiation particle of interest is absorbed by the scintillator 40 and generates a burst of light, or scintillation, in response. The solid state radiation detectors 44 view the scintillator 40 (optionally through the light-coupling light pipe or waveguide 42) and detect the light scintillation using suitable solid state detector elements. The scintillator material is selected to have high stopping power for the 511 keV gamma particles or other particles of interest. For time-of-flight PET systems, the scintillator material is also selected to have a sufficiently fast scintillation decay time to enable good time resolution for time-of-flight information to be extracted. Some suitable scintillator materials for time-of-flight PET include LYSO and LaBr, although other scintillator materials are contemplated.

FIG. 3 diagrammatically illustrates one of the solid state radiation detectors 44. The radiation detector 44 includes a two-dimensional array of radiation detector elements 50 (denoted by a dotted box in FIG. 3; for conciseness only one of the radiation detector elements 50 is labelled by the reference numbers in FIG. 3) defining a detector array area 52 (denoted by a dashed line in FIG. 3) disposed on or in a substrate 54. Although the single detector array is illustrated as disposed on or in a single substrate, it is to be appreciated that a plurality of detector arrays may be disposed on or in a single substrate; that is, a single substrate may support a plurality of detector arrays, each defining a detector array area. The illustrated radiation detector elements 50 each include an avalanche photodiode (APD) D (denoted diagrammatically by the conventional diode circuit symbol in FIG. 3) and a quenching resistor R (denoted by a box in FIG. 3). It is contemplated to omit the quenching resistor R in some embodiments. It is also contemplated to include additional or different components in the radiation detector elements. For example, a p-i-n photodiode or light-sensitive transistor may be substituted for the APD D. In some embodiments, it is contemplated to replace the passive quenching provided by the resistor R with active quenching circuitry or with other circuitry for quenching or other purposes.

The radiation detector elements 50 are connected in parallel between an anode electrode $E_a$ and a cathode electrode $E_c$ by electrically conductive connecting lines including an anode bus line 60 connecting with the anode electrode $E_a$, and a cathode bus line 64 connecting with the cathode electrode $E_c$. In the diagrammatic illustration of FIG. 3, crossings of the anode bus line 60 and electrically conductive connecting lines connecting with the cathode bus line 64 are indicated as being separated by intervening insulating layers 66. In an illustrative fabrication process, the substrate 54 is suitably silicon and the radiation detector elements 50 are monolithically fabricated in or on the substrate 54 using suitable silicon device fabrication technologies, for example including photolithography, dopant diffusion, metal evaporation, metal lift-off, ion implantation, or other suitable silicon processing operations. The electrically conductive connecting lines 60, 64 and the insulating layers 66 are suitably formed and patterned as part of the silicon processing operations. The term "silicon substrate" as used herein is intended to encompass semi-insulating silicon wafers or substrates, silicon-on-insulator wafers or substrates, doped conductive silicon wafers or substrates, or so forth. If a conductive silicon wafer is used, suitable isolation processes such as ion implantation are employed to electrically isolate the individual radiation detector elements 50. Instead of silicon, other materials contemplated for use in fabricating the solid state radiation detectors 44 include silicon carbide (SiC) or gallium nitride (GaN). Moreover, while a monolithic silicon-based fabrication is described, other fabrication techniques can be used, including hybrid techniques integrating components of the same or different material types.

In operation, the APD's D are reversed-biased using the electrodes $E_c$, $E_a$ so that the APD's D are generally electrically nonconductive. However, absorption of a photon of light in the substrate 54 proximate to one of the APD's D causes the proximate APD D to undergo avalanche breakdown and hence become electrically conductive so as to generate a current pulse detectable via the electrodes $E_c$, $E_a$. The quenching resistor R quenches the avalanche process and facilitates recovery of the activated APD D to the nonconductive state. Alternatively, the resistor R may be replaced by active quenching circuitry that facilitates faster recovery of the activated APD D so as to improve temporal resolution, for example for time-of-flight PET.

It will be appreciated that the PET detectors 22 of the hybrid imager are arranged to have some interaction with magnetic fields generated by the MR scanner 10. Such interaction can be substantially reduced by suitable placement of the PET detectors 22 respective to the magnetic field-generating components of the MR scanner 10, but it is nonetheless expected that the PET detectors 22 will interact with dynamic magnetic fields from the MR scanner 10, some of which may be of order a few milliTesla to a few tens of milliTesla. Advantageously, silicon photomultipliers are generally considered to be less sensitive to static magnetic fields as compared with PMT elements conventionally used in PET and SPECT imagers.

However, it is recognized herein that silicon photomultipliers may exhibit undesirable coupling with magnetic fields when one of the APDs is activated, which could degrade the performance of the MR scanner and/or the PET or SPECT imager in a hybrid MR/PET or MR/SPECT imaging system. In a conventional silicon photomultiplier array in which the electrodes define parallel conductive plates, the effect of activation of one of the APD's is to introduce an electrically conductive path between the parallel conductive plates. Depending upon the location of the conducting APD, this can result in formation of a conductive loop that can couple with magnetic fields of the MR scanner. It is estimated herein that the induced voltage can be around a few millivolts for coupling with a 10 milliTesla magnetic field at 10 kilohertz. By comparison, the detected signal of the photodetector is typically around a few tens to a few hundred millivolts. Thus, magnetic coupling is estimated to introduce substantial noise into the PET detection process even when using silicon photomultiplier devices. In the case of time-of-flight PET, the MR-induced noise will significantly reduce time-of-flight measurement accuracy of the detector.

To suppress interaction with magnetic fields during the activated state, the solid state radiation detectors herein including the substrate 54, two dimensional array of solid state detector elements 50 disposed on or in the substrate 54 and defining the detector array area 52, electrodes $E_c$, $E_a$ disposed on or in the substrate 54, and electrically conductive connecting lines 60, 64 disposed on or in the substrate 54 and operatively electrically connecting the solid state detector elements 50 and the electrodes $E_c$, $E_a$ have the electrically conductive connecting lines 60, 64 arranged to define a maximum area in conjunction with any one conducting solid state detector element 50 that is less than or about one tenth of the detector array area 52. In the embodiment shown in FIG. 3, this is accomplished by disposing all of the bus lines 60, 64 on the same side of the detector array area 52. In this way, any conducting detector element 50 will produce a loop of very small area, encompassing at most the length of the row of detector elements 50 that include conducting detector element 50 and the small area between the bus lines 60, 64. This maximum area does not encompass a two-dimensional sub-array of the two-dimensional array of solid state detector elements, but rather at most encompasses one detector row. The layout of the electrically conductive connecting lines of the solid state radiation detector 44 shown in FIG. 3 is described herein as an E-type layout—the horizontal lines of the letter "E" represent electrically conductive connecting lines running parallel with the detector rows, while the vertical connecting line of the letter "E" represents the bus lines 60, 64.

To ensure that the conductive loop defined when a detector elements becomes conductive are of small area, the solid state radiation detector 44 uses the bus lines 60, 64 to connect the detector elements in parallel across the electrodes $E_a$, $E_c$. Unlike some existing silicon photomultipliers, the solid state radiation detector 44 does not include any planar conductive layer having an area larger than one-tenth of the detector array area. For example, the electrodes $E_a$, $E_c$ can be made relatively small, being large enough to enable convenient and reliable soldering or other electrical connection, but being much less than one-tenth of the area of the detector array area 52. In particular, the substrate 54 is not used as an electrode. There is also no large-area planar conductive coating of ITO or another conductive material on the substrate to serve as an electrode.

The E-type layout of FIG. 3 has another advantage in the context of a hybrid PET/computed tomography (CT) scanner, namely that device jitter is reduced significantly. This is advantageous for time-of-flight PET and for hybrid PET/CT. For example, to have time-of-flight PET with below 200 picosecond coincidence time resolution, the individual delay of the individual cells of the solid state photomultiplier device contributes to a photomultiplier device timing jitter of about 160 picoseconds, which is achievable for a 3.5×3.5 mm$^2$ device having an E-type layout.

Other layouts beside the E-type layout of FIG. 3 can be used to ensure that the maximum area defined in conjunction with any one conducting solid state detector element is less than or about one tenth of the detector array area. Other layouts besides the E-type layout of FIG. 3 can be used to ensure that the maximum area defined in conjunction with any one conducting solid state detector element does not encompass a two-dimensional sub-array of the two-dimensional array of solid state detector elements.

With reference to FIG. 4, an alternative solid state radiation detector 44' is illustrated. The radiation detector 44' includes the detector elements 50 (represented as boxes without showing internal detector element components in FIG. 4) defining the detector array area 52, and the electrodes $E_c$, $E_a$, all disposed on or in the substrate 54. However, the radiation detector 44' of FIG. 4 differs from the radiation detector 44 of FIG. 3 in that the anode and cathode bus lines 60, 64 are arranged or disposed along a common bus path 70 passing through the detector array area 52. Note that in FIG. 4, rather than illustrating isolating insulating layers 66 as in FIG. 3 the anode and cathode bus lines 60, 64 are diagrammatically coded in FIG. 4 using solid and dotted lines, respectively. It is to be understood that suitable isolating insulating layers or the like are provided at crossings of the electrically conductive connecting lines.

As used herein, the term "bus path" denotes a narrow path through the detector array area 52 along which the bus lines 60, 64 are arranged or disposed. The illustrated bus path 70 is a straight-line path, but non-straight bus paths such as a curved or bent path are also contemplated. By disposing the bus lines along a narrow bus path and connecting the detector rows to the bus lines, the maximum area defined in conjunction with any one conducting solid state detector element is again minimized. For a symmetric arrangement with a straight bus path as shown in FIG. 4, the layout is suitably termed a double E-type layout (sometimes also denoted as an H-type layout), in which the bus lines 60, 64 along the central bus path define the vertical of the "E", the detector rows running in one direction away from the bus path 70 define the vertical lines of the first "E", and the detector rows running in the opposite direction away from the bus path 70 define the vertical lines of a "backwards E".

In the double E-layout shown in FIG. 4, the maximum area defined in conjunction with any one conducting solid state detector element is less than or about one tenth of the detector array area. In the double-E layout shown in FIG. 4, the maximum area defined in conjunction with any one conducting solid state detector element does not encompass a two-dimensional sub-array of the two-dimensional array of solid state detector elements—rather, it encompasses at most the detector row containing the conducting solid state detector element and the area of the bus path 70 contained between the bus lines 60, 64. Since a bus path is, by definition herein, a narrow path through the detector array area 52, the contribution to the maximum area due to the area of the bus path 70 contained between the bus lines 60, 64 is small.

In the E-type layout of FIG. 3 or the double E-type layout of FIG. 4, there may be some voltage drop along the bus lines 60, 64. However, the voltage drop can be reduced to an acceptable level by using sufficiently thick conductors for the bus lines 60, 64. For example, the bus lines 60, 64 can be conductive traces of width and thickness sufficient to provide a conductor cross-sectional area large enough to reduce the voltage drops to acceptable levels. The double E-type layout of FIG. 4 also reduces such voltage drops by reducing the length along the loop defined by the bus lines 60, 64 and the conductive connecting lines paralleling the detector row containing the conducting detector element.

The illustrated embodiments are analog solid state radiation detectors, and are configured to detect scintillations. However, the techniques disclosed herein for reducing dynamic magnetic field coupling during radiation particle detection events are also applicable to digital solid state radiation detectors, and to radiation detectors for detecting radiation other than scintillations.

With reference to FIG. 5, an alternative solid state radiation detector 44" is illustrated. The radiation detector 44" includes the detector elements 50 (represented as boxes without showing internal detector element components in FIG. 5) defining the detector array area 52, and the electrodes $E_c$, $E_a$, all disposed on or in the substrate 54, and further includes anode and cathode bus lines 60, 64 are arranged or disposed along common bus path 70 passing through the detector array area 52. However, in FIG. 5 the parallel electrical interconnection of the detector elements 50 is achieved using a meandering "back-and-forth" electrical interconnection. In the layout shown in FIG. 5, the parallel interconnections are arranged into four meandering-path subunits each of rectangular area—in FIG. 5, the upper righthand subunit is delineated by a dotted box 80. When one of the detector elements 50 is activated and becomes conductive, the resulting electrical conduction loop encompasses at most a substantial portion of the meandering-path subunit containing the conductive detector element. For the layout shown in FIG. 5, this means that the electrically conductive connecting lines define a maximum area in conjunction with any one conducting solid state detector element 50 that is less than one-fourth of the detector array area 52. However, by further sub-division of the cells into a greater number of meandering-path sub-units, the electrically conductive connecting lines can be arranged to define a maximum area in conjunction with any one conducting solid state detector element that is less than or about one-tenth of the detector array area. Subunits having other layouts besides the illustrated meandering layout are also contemplated, such as subunits having a circular or rectangular spiral layout.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A radiation detector comprising:
a substrate;
a two-dimensional array of solid state detector elements disposed on or in the substrate and defining a detector array area;
anode and cathode electrodes disposed on or in the substrate; and
electrically conductive connecting lines disposed on or in the substrate and operatively electrically connecting the solid state detector elements in parallel between the anode and cathode electrodes;
wherein the radiation detector does not include any planar conductive layer having an area larger than one-tenth of the detector array area.

2. A radiation detector comprising:
a substrate;
a two-dimensional array of solid state detector elements disposed on or in the substrate and defining a detector array area;
anode and cathode electrodes disposed on or in the substrate; and
electrically conductive connecting lines disposed on or in the substrate and operatively electrically connecting the solid state detector elements in parallel between the anode and cathode electrodes;
wherein the electrically conductive connecting lines include anode and cathode bus lines connected with the anode and cathode electrodes, respectively, and the anode and cathode bus lines are disposed along a common bus path passing through the detector array area.

3. The radiation detector as set forth in claim 2, wherein the electrically conductive connecting lines have an E-type or double E-type layout.

4. The radiation detector as set forth in claim 2, wherein the solid state detector elements include avalanche photodiodes.

5. The radiation detector as set forth in claim 1, wherein the substrate is a silicon substrate and the solid state detector elements comprise silicon-based detector elements monolithically formed on or in the silicon substrate.

6. The radiation detector as set forth in claim 5, wherein each solid state detector element comprises:
an avalanche photodiode; and
a resistor electrically connected in series with the avalanche photodiode.

7. The radiation detector as set forth in claim 2, wherein the electrically conductive connecting lines are arranged to define a maximum area contained in a conductive loop connecting any one conducting solid state detector element with the anode and cathode electrodes that is less than or about one-tenth of the detector array area.

8. The radiation detector as set forth in claim 2, wherein the electrically conductive connecting lines include anode and cathode bus lines with the anode and cathode electrodes, respectively, and the anode and cathode bus lines are disposed on a same side of the detector array area.

9. The radiation detector as set forth in claim 2, further comprising:
a scintillator element optically coupled with the two-dimensional array of solid state detector elements such that the two-dimensional array of solid state detector elements detects scintillations generated in the scintillator element.

10. The radiation detector as set forth in claim 2, wherein the electrically conductive connecting lines are arranged to define a maximum area contained in a conductive loop connecting any one conducting solid state detector element with the anode and cathode electrodes that does not encompass a two-dimensional sub-array of the two-dimensional array of solid state detector elements.

11. An imaging system comprising:
a magnetic resonance (MR) scanner; and
a positron emission tomography (PET) or single photon emission computed tomography (SPECT) imaging system arranged to have some interaction with a magnetic field generated by the MR scanner, the PET or SPECT imaging system including scintillator elements and radiation detectors as set forth in claim 2 arranged to detect scintillations generated in the scintillator elements.

12. A radiation detector comprising:
a substrate;
a two-dimensional array of solid state detector elements disposed on or in the substrate and defining a detector array area;
anode and cathode electrodes disposed on or in the substrate; and
electrically conductive connecting lines disposed on or in the substrate and operatively electrically connecting the solid state detector elements in parallel between the anode and cathode electrodes, the electrically conductive connecting lines arranged to define a maximum area contained in a conductive loop connecting any one conducting solid state detector element with the anode and cathode electrodes that is less than or about one-tenth of the detector array area.

13. The radiation detector as set forth in claim 12, further comprising:
a scintillator element optically coupled with the two-dimensional array of solid state detector elements such that the two-dimensional array of solid state detector elements detects scintillations generated in the scintillator element.

14. The radiation detector as set forth in claim 12, wherein the electrically conductive connecting lines include a plurality of bus lines, the solid state detector elements being arranged in a plurality of branches extending from the bus lines, the detector elements of each branch being arranged in parallel.

15. The radiation detector as set forth in claim 12, wherein the electrically conductive connecting lines include a plurality of bus lines all disposed along a common bus path passing through the detector array area.

16. The radiation detector as set forth in claim 12, wherein the radiation detector does not include any planar conductive layer having an area larger than one-tenth of the detector array area.

17. The radiation detector as set forth in claim 12, wherein the electrically conductive connecting lines have an E-type or double E-type layout.

18. The radiation detector as set forth in claim 12, wherein the solid state detector elements include avalanche photodiodes.

19. The radiation detector as set forth in claim 12, wherein the substrate is a silicon substrate and the solid state detector elements comprise silicon-based detector elements monolithically formed on or in the silicon substrate.

20. The radiation detector as set forth in claim 19, wherein each solid state detector element comprises:
an avalanche photodiode; and
a quenching circuit or device arranged to quench an avalanche current flowing in the avalanche photodiode.

21. An imaging system comprising:
a magnetic resonance (MR) scanner; and
a positron emission tomography (PET) or single photon emission computed tomography (SPECT) imaging system arranged to have some interaction with a magnetic field generated by the MR scanner, the PET or SPECT imaging system including scintillator elements and radiation detectors as set forth in claim 12 arranged to detect scintillations generated in the scintillator elements.

22. A radiation detector comprising:
a substrate;
a two-dimensional array of solid state detector elements disposed on or in the substrate and defining a detector array area; and
electrically conductive connecting lines disposed on or in the substrate and operatively electrically connecting the solid state detector elements in parallel between an anode electrode and a cathode electrode, the electrically conductive connecting lines arranged to define a maximum area contained in a conductive loop connecting any one conducting solid state detector element with the anode and cathode electrodes that does not encompass a two-dimensional sub-array of the two-dimensional array of solid state detector elements.

23. The radiation detector as set forth in claim 22, wherein each solid state detector element comprises:
an avalanche photodiode; and
a resistor electrically connected in series with the avalanche photodiode.

* * * * *